No. 748,614. PATENTED JAN. 5, 1904.
J. H. JONES.
AUTOMATIC ATTACHMENT FOR GATES.
APPLICATION FILED AUG. 10, 1903.
NO MODEL.

Witnesses
Jas Gadsby
C. Robinson

Inventor
Joseph Henry Jones
By W. Bruce
Att'y

UNITED STATES PATENT OFFICE.

JOSEPH HENRY JONES, OF SCOTLAND, CANADA, ASSIGNOR OF ONE-HALF TO JAMES EDWARD ELLIOTT, OF SCOTLAND, ONTARIO, CANADA.

AUTOMATIC ATTACHMENT FOR GATES.

SPECIFICATION forming part of Letters Patent No. 748,614, dated January 5, 1904.

Application filed August 10, 1903. Serial No. 169,038. (No model.)

*To all whom it may concern:*

Be it known that I, JOSEPH HENRY JONES, a citizen of the Dominion of Canada, residing at Scotland, in the county of Brant, in the Province of Ontario, Dominion of Canada, have invented a certain new and useful Automatic Attachment for Gates; and I do hereby declare that the following is a full, clear, and exact description of the construction and operation of the same.

The invention relates to a very simple but handy and convenient automatic attachment to gates by which equestrians can open and close the gate without dismounting. I attain this object by the mechanism illustrated in the accompanying drawings, in which—

Figure 1:
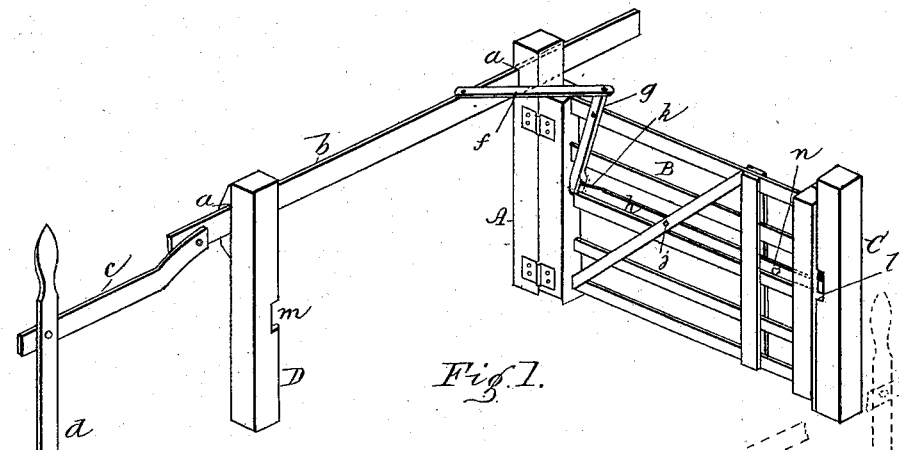
Figure 2:
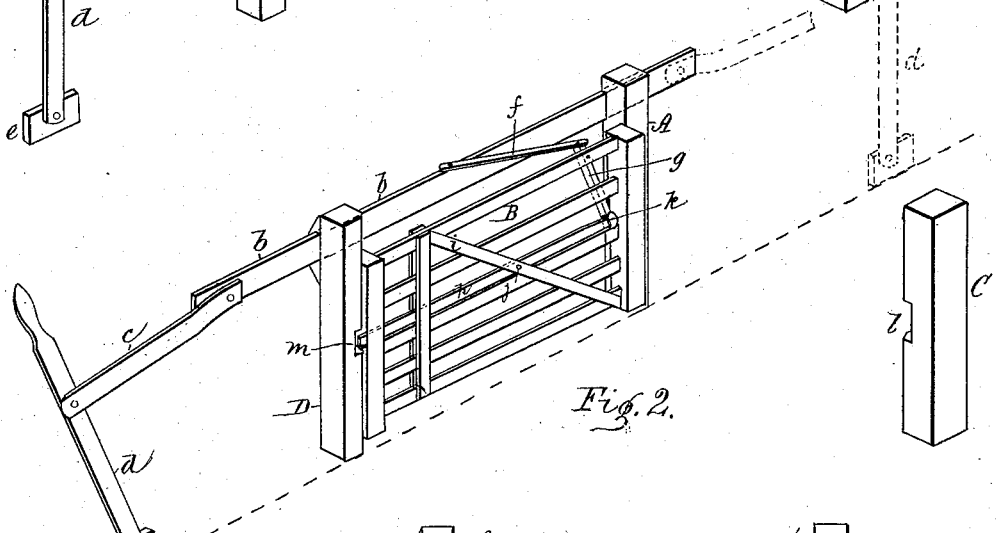
Figures 3, 4:
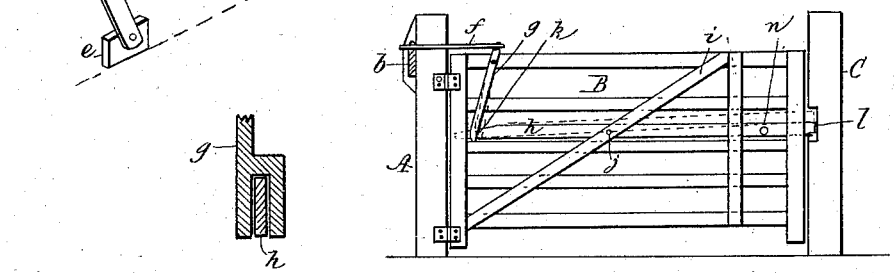

Figure 1 is a perspective view of a gate embodying my invention, showing gate closed. Fig. 2 is a similar view, but showing the gate open. Fig. 3 is a side elevation of a gate, showing how the latch is released from the catch in the post. Fig. 4 is a cross-section of the latch-bar and operating-lever broken away and detached from the gate.

It will be seen that my gate attachment is simple but efficient, as with it a gate can be forced open, forced shut, locked shut, and locked open, all with two motions of the lever. The gate does not require any special hanging and will maintain an equal distance from the ground while opening. The attachment will work on any gate that swings, and there is nothing to easily get out of order, as there are no springs, weights, or cords in its construction. Persons on foot can open the gate as easily as equestrians, and vice versa.

In the drawings, A represents the post to which the gate B is hinged, and C the post against which it closes.

D is a post placed the width of the gate from the post A, the two latter posts having notches $a$ cut in them to receive a connecting-bar $b$, which is made to slide back and forth in the notches and to which is pivoted one end of a short connecting-rod $c$ and the other being pivoted to a hand-lever $d$, which in turn is pivoted at the lower end to a post or block $e$, fixed in the ground.

The gate B and the sliding bar $b$ are connected by means of a cross-bar $f$, pivoted at one end to the top of the said sliding bar and at the other end to the top of a slanting movable lever $g$, which in turn is pivoted to the top rail of the gate. The lower part of the said lever is forked and made to straddle the latch-bar $h$, which it raises to allow the gate to be opened by the movement of the lever $d$, the said latch-bar $h$ being pivoted to the slanting brace-bar $i$ at the point $j$. The rear end of the said latch-bar $i$ is beveled at $k$, where the pivoted lever $g$ straddles it, and a slight pull on the outer lever $d$ causes the bottom of the lever $g$ to move slightly forward on the inclined portion $k$ of the latch-bar $h$ and elevate the opposite end and release it from the catch $l$ in the post C, when the gate will be free to open, as seen in Fig. 2. and when it reaches the post D the latch-bar rides over the catch $m$, where it is locked open until a backward pressure on the lever $d$ releases the latch-bar $h$ from catch $m$ and closes the gate and is self-locked in the catch $l$, as in Fig. 1, until the lever $d$ is again operated.

$n$ is a hand-lift attached to the outer end of the latch-bar $h$ for foot-passengers to operate the same and open the gate.

It will also be seen that the sliding bar $b$ can be elongated, so as to slide in another post similar to the post D on the opposite side of the gate, with a duplicate of the operating-lever $d$.

Having thus described my device and its advantages, what I claim as my invention, and desire to secure by Letters Patent, is—

An opening and closing attachment to a gate, consisting of a horizontal bar made to slide in notches in the hinged post and slam-post, an operating-lever pivoted to a block or post in the ground and a short connecting-bar pivoted to the lever and to the sliding bar, a short lever pivoted to the gate, a connecting-rod pivoted to the top of it and to the sliding bar, a latch-bar pivoted to the gate and having its inner end inclined, the short lever being forked at the end and made to straddle the latch-bar to release it from its catch on the post when the operating-lever is moved to open the gate, all constructed substantially as and for the purpose specified.

Dated at Hamilton, Ontario, June 9, 1903.

JOSEPH HENRY JONES.

In presence of—
 E. D. LEITCH,
 W. BRUCE.